(12) United States Patent
Lehtiniemi et al.

(10) Patent No.: US 9,681,186 B2
(45) Date of Patent: Jun. 13, 2017

(54) METHOD, APPARATUS AND COMPUTER PROGRAM PRODUCT FOR GATHERING AND PRESENTING EMOTIONAL RESPONSE TO AN EVENT

(71) Applicant: Nokia Technologies Oy, Espoo (FI)

(72) Inventors: Arto Juhani Lehtiniemi, Lempaala (FI); Antti Johannes Eronen, Tampere (FI); Juha Henrik Arrasvuori, Tampere (FI); Jukka Antero Holm, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/915,095

(22) Filed: Jun. 11, 2013

(65) Prior Publication Data

US 2014/0366049 A1 Dec. 11, 2014

(51) Int. Cl.
*H04N 21/442* (2011.01)
*G11B 27/034* (2006.01)
(Continued)

(52) U.S. Cl.
CPC ..... *H04N 21/44218* (2013.01); *G11B 27/034* (2013.01); *G11B 27/105* (2013.01); *G11B 27/34* (2013.01); *G06F 3/015* (2013.01)

(58) Field of Classification Search
CPC ......... H04N 21/4826; H04N 21/44204; H04N 21/44222; H04N 21/4781; H04N 21/6587;
(Continued)

(56) References Cited

U.S. PATENT DOCUMENTS 6,493,690 B2 12/2002 Bertrand et al.
7,716,606 B2 5/2010 Rekimoto
(Continued)

FOREIGN PATENT DOCUMENTS

JP 2002-204419 A 7/2002
JP 2005-128884 A 5/2005
(Continued)

OTHER PUBLICATIONS

Eronen, K., *Rhythm Metadata Enabled Intra-Track Navigation and Content Modification in a Music Player*, Proceedings of the 5th International Conference on Mobile and Ubiquitous Multimedia, vol. 193 (2006) pp. 1-8.
(Continued)

*Primary Examiner* — Benjamin R Bruckart
*Assistant Examiner* — Aklil Tesfaye
(74) *Attorney, Agent, or Firm* — Alston & Bird LLP

(57) ABSTRACT

Provided herein is a method, apparatus and computer program product for gathering and presenting emotional response to an event in the form of an emotional response timeline. In particular, the method may include generating a timeline of a collected emotional response of a user relative to an event, selecting, by a processor, a portion of the timeline of the emotional response that meets at least one predefined criterion, and generating an edited event based on the portion of the timeline of the emotional response that meets the at least one predetermined criterion. The emotional response may include one or more of a heart rate, a facial expression, a vocalization, or a facial flush. The at least one predetermined criterion may include an emotional response above a predefined threshold.

15 Claims, 13 Drawing Sheets

(51) Int. Cl.
  *G11B 27/34* (2006.01)
  *G11B 27/10* (2006.01)
  *G06F 3/01* (2006.01)

(58) Field of Classification Search
  CPC ..... H04N 21/44218; H04N 21/434327; H04N 21/2402; H04N 21/2662; H04N 21/234309; H04N 21/2353; H04N 21/44004; H04N 21/4621; G11B 27/034; G11B 27/34; G11B 27/105; G06F 3/015
  USPC ...................................................... 725/9–21
  See application file for complete search history.

(56) References Cited

U.S. PATENT DOCUMENTS

| | | | |
|---|---|---|---|
| 8,132,202 B2* | 3/2012 | Swix et al. | 725/34 |
| 2003/0093784 A1 | 5/2003 | Dimitrova et al. | |
| 2003/0131351 A1* | 7/2003 | Shapira | 725/24 |
| 2004/0219498 A1 | 11/2004 | Davidson | |
| 2005/0289582 A1 | 12/2005 | Tavares et al. | |
| 2006/0143647 A1* | 6/2006 | Bill | 725/10 |
| 2006/0294467 A1* | 12/2006 | Auterinen | G06F 17/30056 715/723 |
| 2007/0150916 A1* | 6/2007 | Begole et al. | 725/10 |
| 2008/0189733 A1* | 8/2008 | Apostolopoulos | 725/28 |
| 2008/0214902 A1 | 9/2008 | Lee et al. | |
| 2008/0250082 A1 | 10/2008 | Dive-Reclus | |
| 2008/0300700 A1* | 12/2008 | Hammer | H04R 29/00 700/94 |
| 2009/0022472 A1 | 1/2009 | Bronstein et al. | |
| 2009/0122147 A1 | 5/2009 | Takashima | |
| 2009/0144785 A1* | 6/2009 | Walker et al. | 725/105 |
| 2009/0167787 A1 | 7/2009 | Bathiche et al. | |
| 2009/0195392 A1* | 8/2009 | Zalewski | 340/573.1 |
| 2010/0005658 A1 | 1/2010 | Haverkost et al. | |
| 2010/0186052 A1* | 7/2010 | Hyun | G06F 17/30781 725/88 |
| 2010/0257252 A1 | 10/2010 | Dougherty et al. | |
| 2010/0274774 A1 | 10/2010 | Son et al. | |
| 2010/0290761 A1* | 11/2010 | Drake et al. | 386/350 |
| 2010/0306712 A1 | 12/2010 | Snook et al. | |
| 2011/0090253 A1 | 4/2011 | Good | |
| 2011/0105857 A1 | 5/2011 | Zhang et al. | |
| 2011/0270135 A1 | 11/2011 | Dooley et al. | |
| 2012/0003622 A1 | 1/2012 | Drane et al. | |
| 2012/0072936 A1* | 3/2012 | Small | G06Q 30/00 725/10 |
| 2012/0089437 A1* | 4/2012 | Amento et al. | 705/7.29 |
| 2012/0174032 A1* | 7/2012 | Greene | G06Q 30/02 715/811 |
| 2012/0210228 A1* | 8/2012 | Wang | G11B 27/005 715/723 |
| 2012/0222058 A1* | 8/2012 | el Kaliouby et al. | 725/10 |
| 2012/0324491 A1* | 12/2012 | Bathiche et al. | 725/10 |
| 2013/0345840 A1* | 12/2013 | Lempel | G06Q 30/0255 700/94 |
| 2014/0023338 A1* | 1/2014 | Won | H04N 21/4223 386/230 |
| 2014/0049695 A1* | 2/2014 | Papish et al. | 348/731 |
| 2014/0137144 A1* | 5/2014 | Jarvenpaa et al. | 725/13 |
| 2014/0169765 A1* | 6/2014 | Wang et al. | 386/280 |

FOREIGN PATENT DOCUMENTS

| | | |
|---|---|---|
| JP | 2010271536 A | 12/2010 |
| JP | 2010283478 A | 12/2010 |

OTHER PUBLICATIONS

Goto, M., *A Chorus-Section Detecting Method for Musical Audio Signals*, Proceedings of ICASSP, vol. 437-440, (2003) pp. 1-4.

Wood, G., et al., *On Techniques for Content-Based Visual Annotation to Aid Intra-Track Music Navigation*, Proceedings of ISMIR (2005) pp. 1-8.

Moodbar [online][retrieved Jul. 24, 2013] Retrieved from: <URL: http://en.wikipedia.org/wiki/Moodbar> 2 pages.

International Search Report and Written Opinion from International Application No. PCT/FI2014/050450, dated Sep. 5, 2014.

Office Action for European Application No. 14 734 851.0 dated Sep. 19, 2016.

\* cited by examiner

US 9,681,186 B2

METHOD, APPARATUS AND COMPUTER PROGRAM PRODUCT FOR GATHERING AND PRESENTING EMOTIONAL RESPONSE TO AN EVENT

TECHNOLOGICAL FIELD

Example embodiments of the present invention relate generally to the presentation of information on a display, and more particularly, to a method, apparatus, and computer program product to gather and present emotional response to an event in the form of an emotional response timeline.

BACKGROUND

The modern communications era has brought about a tremendous expansion of wireline and wireless networks. Computer networks, television networks, and telephone networks are experiencing an unprecedented technological expansion, fueled by consumer demand. Wireless and mobile networking technologies have addressed consumer demands while providing more flexibility and immediacy of information transfer.

Mobile devices, such as cellular telephones, have become smaller and lighter while also becoming more capable of performing tasks that far exceed a traditional voice call. Mobile devices are becoming small, portable computing devices that are capable of running a variety of applications. Such devices are also capable of storing and/or accessing tremendous amounts of data and information such as media files (e.g., music files, video files, etc.), documents, websites, etc. With the universe of information available to a user on a device, organization of this information has become important to facilitate a user finding the information they are seeking.

SUMMARY

In general, an example embodiment of the present invention provides a method of gathering and presenting emotional response to an event in the form of an emotional response timeline. In particular, the method of example embodiments may include generating a timeline of a collected emotional response of a user relative to an event, selecting, by a processor, a portion of the timeline of the emotional response that meets at least one predefined criterion, and generating an edited event based on the portion of the timeline of the emotional response that meets the at least one predetermined criterion. The emotional response may include one or more of a heart rate, a facial expression, a vocalization, or a facial flush. The at least one predetermined criterion may include an emotional response above a predefined threshold. The at least one predetermined criterion may include at least one of a heart rate above a predefined threshold, a facial expression of at least one predefined type, a vocalization of at least one predetermined utterance, or a facial flush of a predefined hue. Each of the at least one predetermined criterion may be user adjustable. The event may include a media file, and the edited event may include a media file including only portions of the event where the emotional response was above a threshold. Methods of example embodiments may optionally include calibrating a baseline emotional response for the event.

Example embodiments of the invention may provide an apparatus including at least one processor and at least one memory including computer program code. The at least one memory and the computer program code are configured to, with the at least one processor, cause the apparatus to generate a timeline of a collected emotional response of a user relative to an event, select a portion of the timeline of the emotional response that meets at least one predetermined criterion, and generate an edited event based on the portion of the timeline of the emotional response that meets the at least one predetermined criterion. The emotional response may include one or more of a heart rate, a facial expression, a vocalization, or a facial flush. The at least one predetermined criterion may include an emotional response above a predefined threshold. The at least one predetermined criterion may include at least one of a heart rate above a predefined threshold, a facial expression of at least one predefined type (e.g., happy, angry, surprised, disgusted, sad, fearful, etc.), a vocalization of at least one predetermined utterance, or a facial flush of a predefined hue. Each of the at least one predetermined criterion may be user adjustable. The event may include a media file and the edited event may include a media file including only portions of the event where the emotional response was above a threshold. The apparatus of example embodiments may optionally be caused to calibrate a baseline emotional response for the event.

Embodiments of the present invention may provide a computer program product including at least one non-transitory, computer-readable storage medium having computer executable program code instructions stored therein. The computer executable program code instructions may include program code instructions to generate a timeline of a collected emotional response of a user relative to an event, program code instructions to select a portion of the timeline of the emotional response that meets at least one predetermined criterion, and program code instructions to generate an edited event based on the portion of the timeline of the emotional response that meets the at least one predetermined criterion. The emotional response may include one or more of a heart rate, a facial expression, a vocalization, or a facial flush. The at least one predetermined criterion may include an emotional response above a predefined threshold. The at least one predetermined criterion may include at least one of a heart rate above a predefined threshold, a facial expression of at least one predefined type, a vocalization of at least one predetermined utterance, or a facial flush of a predefined hue. Each of the at least one predetermined criterion may be user adjustable. The event may include a media file and the edited event includes a media file including only portions of the event where the emotional response was above a threshold.

Example embodiments of the invention may provide an apparatus including means for generating a timeline of a collected emotional response of a user relative to an event, means for selecting a portion of the timeline of the emotional response that meets at least one predefined criterion, and means for generating an edited event based on the portion of the timeline of the emotional response that meets the at least one predetermined criterion. The emotional response may include one or more of a heart rate, a facial expression, a vocalization, or a facial flush. The at least one predetermined criterion may include an emotional response above a predefined threshold. The at least one predetermined criterion may include at least one of a heart rate above a predefined threshold, a facial expression of at least one predefined type, a vocalization of at least one predetermined utterance, or a facial flush of a predefined hue. Each of the at least one predetermined criterion may be user adjustable. The event may include a media file, and the edited event may include a media file including only portions of the event where the emotional response was above a threshold. An apparatus of example embodiments may optionally include means for calibrating a baseline emotional response for the event.

DRAWINGS

Having thus described embodiments of the invention in general terms, reference will now be made to the accompanying drawings, which are not necessarily drawn to scale, and wherein:

Figure 12:
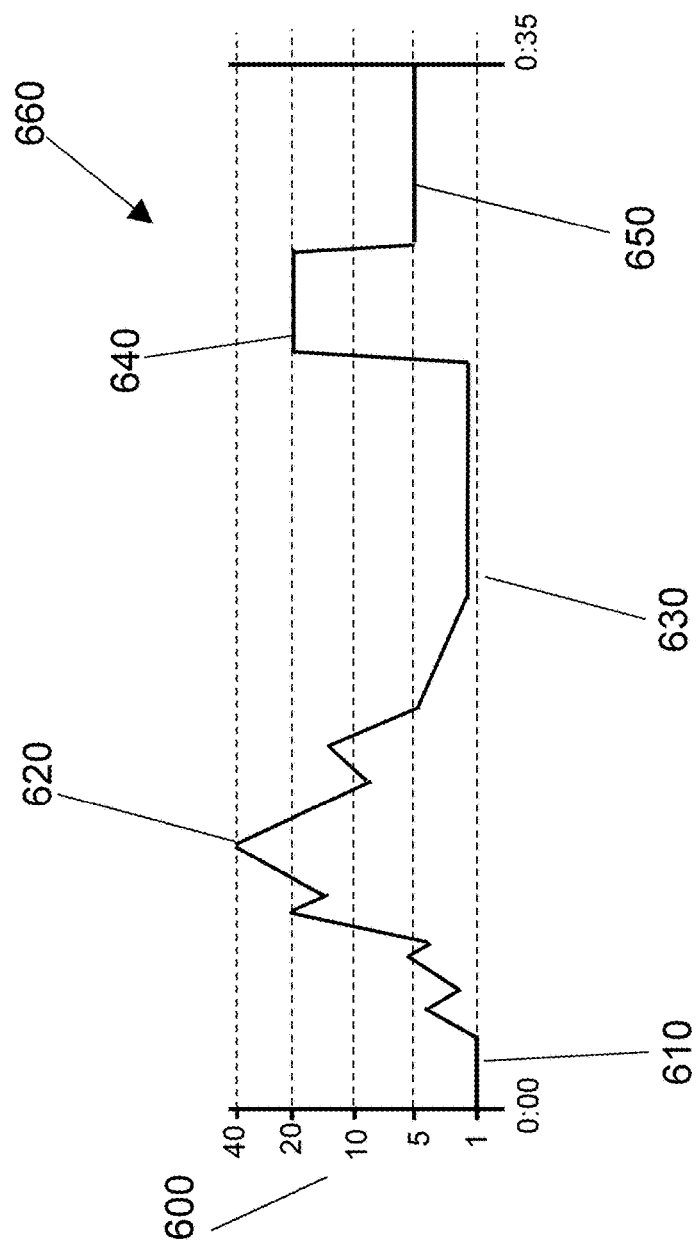
Figure 13:
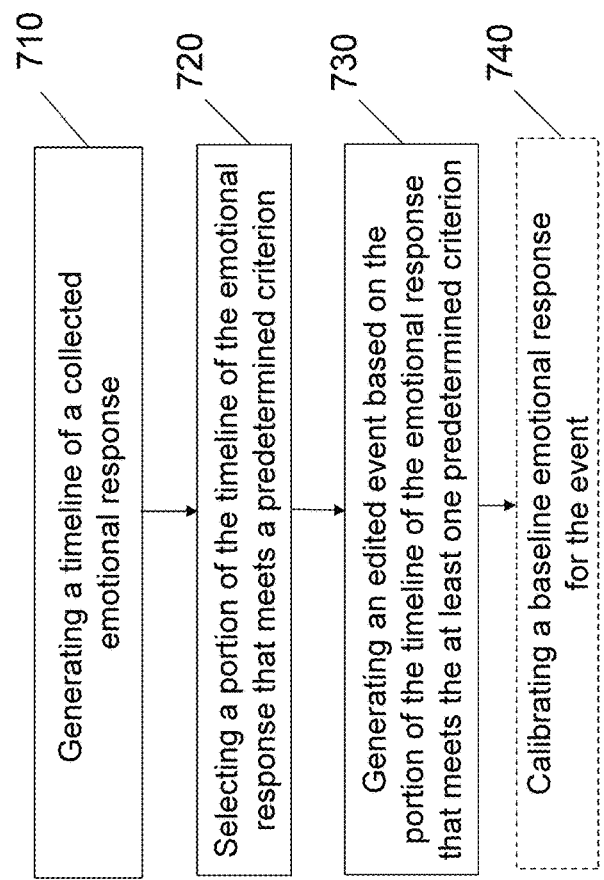

FIG. 12 illustrates an example of an emotional response timeline which depicts emotional response relative to an orchestral arrangement according to an embodiment of the present invention; and FIG. 13 is a flowchart of a method for providing a mechanism for gathering and presenting emotional response to an event in the form of an emotional response timeline according to an example embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with some embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Some embodiments of the present invention may relate to provision of a mechanism by which a user's emotional response to an event is collected such that portions of the event which prompted an elevated emotional response may be gathered to represent the event in the form of an edited event. In some example embodiments, portions of an event that prompted an elevated emotional response may be altered, omitted, or otherwise obscured for a re-creation of the event. An event may be defined as an event that a user may experience, such as an audio file where the user may listen to the event or a video file, concert, theatrical show, lecture, performance, etc. where the user may watch and listen to the event. During the event, a user's emotional response may be collected to generate a timeline view of the user's emotional response during the event. The timeline of emotional response may then be used in various manners to alter how an event is later presented, rated, summarized, highlighted, or otherwise edited.

Figure 1:
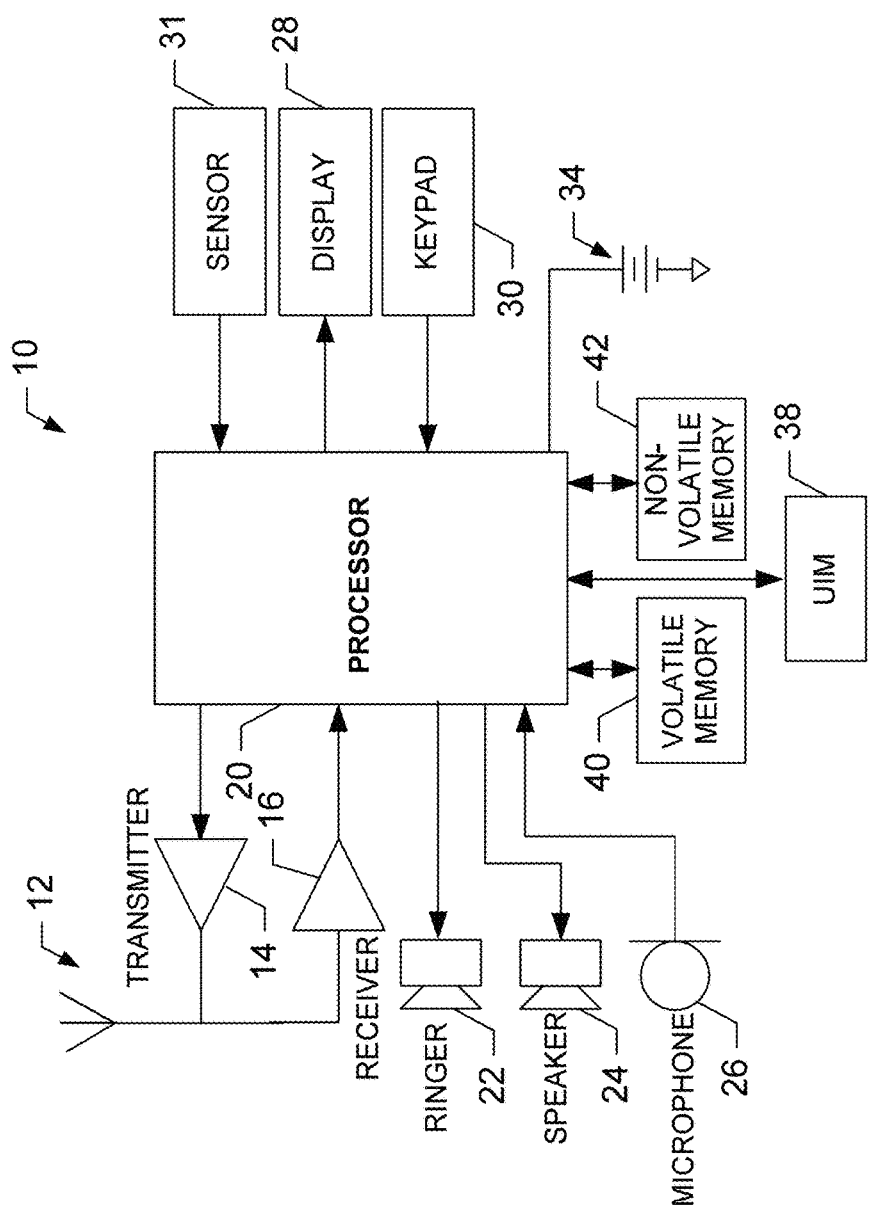
FIG. 1 is a schematic block diagram of a mobile terminal according to an example embodiment of the present invention.

One example embodiment of the invention is depicted in FIG. 1 which illustrates a block diagram of a mobile terminal 10 that may benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch display (display 28 providing an example of such a touch display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch display may omit the keypad 30 and any or all of the speaker 24, ringer 22, and microphone 26 entirely. Additional input to the processor 20 may include a sensor 31. The sensor 31 may include one or more of a motion sensor, temperature sensor, light sensor, accelerometer, heart-rate sensor, thermal sensor, thermal imaging sensor, or the like. Forms of input that may be received by the sensor may include physical motion of the mobile terminal 10, whether or not the mobile terminal 10 is in a dark environment (e.g., a pocket) or in daylight, whether the mobile terminal is being held by a user or not (e.g., through temperature sensing of a hand or through heart-rate detection). The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

An example embodiment of the present invention will now be described with reference to FIG. 2, in which certain elements of an apparatus 50 for providing a mechanism by which a user's emotional response to an event may be collected and an event may be altered in response to the emotional response. The apparatus 50 of FIG. 2 may be embodied by or otherwise associated with a device such as mobile terminal 10 of FIG. 1.

The apparatus 50 may, in some embodiments, be embodied by or otherwise associated with a mobile terminal (e.g., mobile terminal 10) as illustrated in FIG. 1 or a computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen(s), touch areas, device surfaces and/or sensors capable of detecting objects hovering over the surface, soft keys, a microphone, a speaker, motion sensor, temperature sensor, accelerometer, or other input/output mechanisms. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the apparatus 50 may include or otherwise be in communication with a display, which may be combined with the user interface 72 as a touch screen display. In different example cases, the user interface 72 may include a two dimensional (2D) or three dimensional (3D) display. In an example embodiment with a touch screen display, the touch screen display may be embodied as any known touch screen display. Thus, for example, the touch screen display could be configured to enable touch recognition by any suitable technique, such as resistive, capacitive, infrared, strain gauge, surface wave, optical imaging, dispersive signal technology, acoustic pulse recognition, etc. techniques. As such user interface 72 may be in communication with the touch screen display to receive indications of user inputs at the touch screen display and to modify a response to such indications based on corresponding user actions that may be inferred or otherwise determined responsive to the indications. In one alternative, a touch input may be provided other than by direct interaction with a display (e.g., in cases where the user interface is projected onto a wall with a projector, or where a cursor is used to direct input on the display).

In an example embodiment, the apparatus 50 may include an emotion interface 80. The emotion interface 80 may, in some instances, be a portion of the user interface 72. However, in some alternative embodiments, the emotion interface 80 may be embodied as the processor 70 or may be a separate entity controlled by the processor 70. As such, in some embodiments, the processor 70 may be said to cause, direct or control the execution or occurrence of the various functions attributed to the emotion interface 80 (and any components of the emotion interface 80) as described herein. The emotion interface 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the emotion interface 80 as described herein. Thus, in examples in which software is employed, a device or circuitry (e.g., the processor 70 in one example) executing the software forms the structure associated with such means.

The emotion interface 80 may be configured to receive an indication of an input in the form of an emotional response at the sensor 82. The sensor 82 may be configured to receive an indication of, for example, a facial expression from an image capture sensor (e.g., a camera), a vocalization from an audio sensor (e.g., a microphone), a heart rate from a heart rate sensor, and/or a level of facial flush from a thermal imaging sensor or an image sensor, for example. The emotion sensor 82 may receive an indication of an emotional response from two or more of the foregoing sensors and/or from additional sensors confirmed to provide an indication of an emotional response. The emotion sensor 82 may be in communication with the emotion detection unit 84 to receive indications of the emotions received at sensor 82. Following recognition of an emotional response at the emotion interface 80, such as by the receipt of a predefined type of indication from a predetermined sensor, the emotion detection unit 84 may be configured to determine a classification of the emotion and provide a corresponding response based on the emotion in some situations or otherwise provide the detected emotion to the processor 70.

Figure 2:
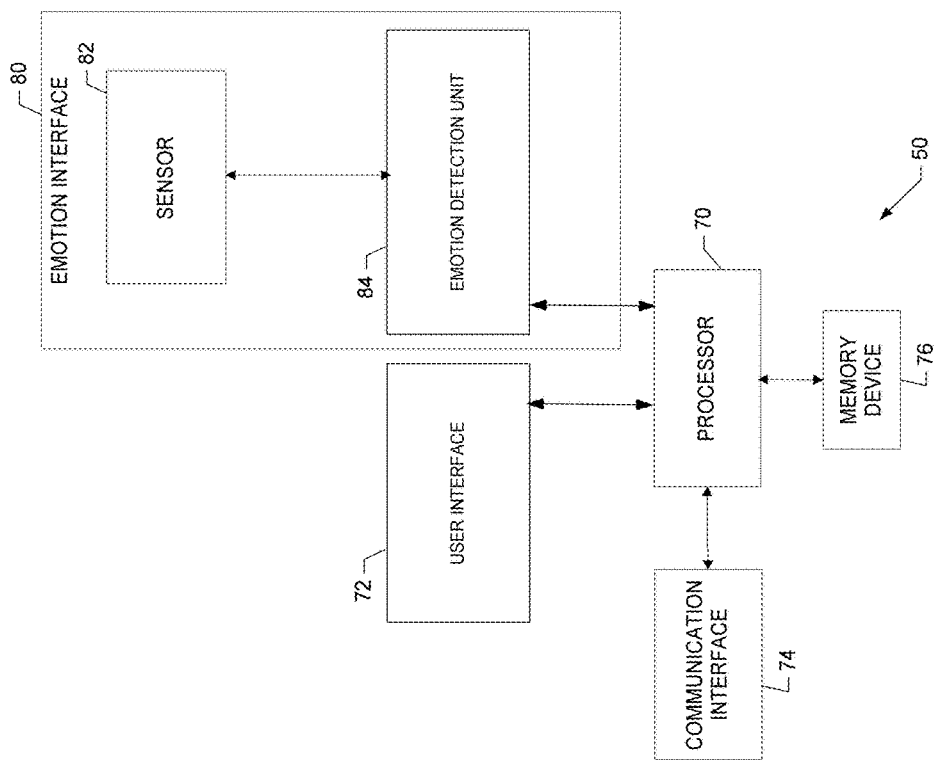
FIG. 2 is a schematic block diagram of an apparatus for providing a mechanism by which emotionally significant information may be gathered and presented according to an example embodiment of the present invention.
Figure 3:
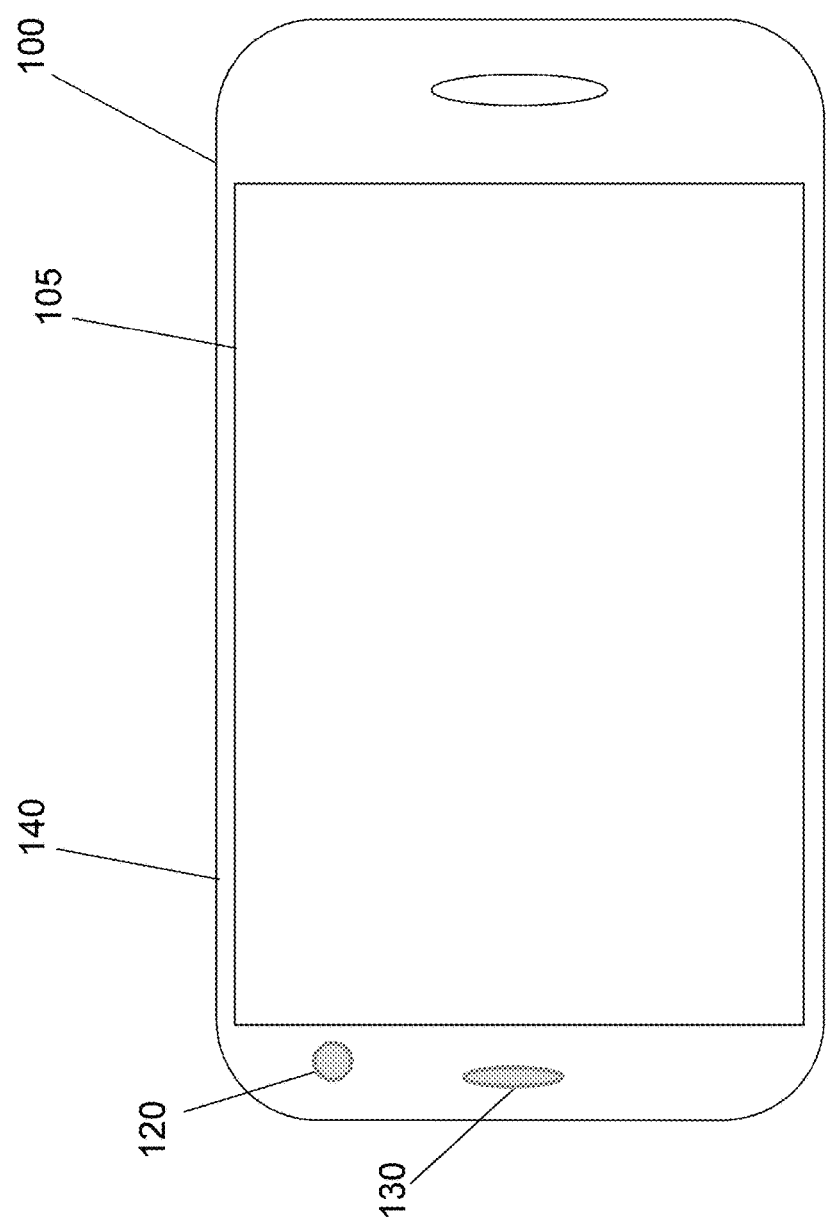
FIG. 3 illustrates a device for providing a mechanism by which the emotional response by a user may be collected during an event such that a timeline of the emotional response may be generated according to an example embodiment of the present invention.

FIG. 3 illustrates a device 100 for providing a mechanism by which the emotional response by a user may be collected during an event such that a timeline of the emotional response may be generated. The device of the illustrated embodiment may include a first sensor 120, such as an image sensor (e.g., camera) or thermal image sensor. The device 100 may optionally or alternatively include a second sensor 130, which may include a microphone to capture audio. Other sensors may optionally be employed, such as a heart rate sensor 140 which may be disposed in a portion of the perimeter likely to be held by a user's hand where a heart rate may be detected. Each of these sensors may correspond to sensor 82 of the emotion interface 80 of FIG. 2. The heart rate sensor 140 may be configured to determine a user's pulse through their fingers while holding the device 100. The image sensor 120 or thermal image sensor may be configured to capture a user's facial expression or a user's gestures to determine an emotional response. An image sensor 120 may also be capable of detecting a change in hue of at least a portion of a user's face, such as during a facial flushing where the user's face becomes flushed and more red than a baseline, un-flushed response. For example, the sensor (e.g., sensor 82) may be configured to capture the data, such as a facial hue, while the emotion detection unit 84 (or optionally processor 70) may determine the hue and a related emotion. During a facial flush, the temperature of a person's face or portions of a person's face may increase due to the increased blood flow proximate the surface of the user's skin. As such, a thermal image capture sensor may detect elevated temperatures of at least a portion of a user's face relative to a baseline, un-flushed facial temperature to detect the facial flush emotional response. The microphone 130 may be configured to detect a vocalization of a user. For example, a scream, a laugh, a sigh, a gasp, predetermined words (e.g., "oh my!"), or any other utterances may be configured to be detected by the microphone to establish an emotional response.

The aforementioned emotional responses, together with any additional potential emotional responses, may be collected during an event, such as via emotion interface 80. The event may include, for example, a performance (e.g., concert, theater, lecture, comedy show, opera, etc.), a media file playback (e.g., the playing of a music file or a video file), a sporting event, etc. In some example embodiments, such as when the event is provided for display on the device 100 of FIG. 3, the event may be presented on display 105. During the event, a user's emotional response to the event may be collected by a sensor (e.g., sensor 82 of FIG. 2). The emotional response of a user may interpreted by emotion detection unit 84 and may then be used to tailor the event for presentation to the user or to other users, or to tailor future events to the user's preferences, as will be described further below. The emotional response timeline may be stored, for example, in memory device 76.

In some example embodiments, such as during a live presentation of an event, a user may observe the event while sensors 120, 130, and 140 collect the emotional response of one or more users. The live event may be captured by the device 100, such as by audio and/or video recording, or the live event may be captured by another device, such as television cameras at a sporting event. In such an embodiment, the emotional response collected and the recording of the event may later be correlated on a device which may or may not be the user device 100. In an example embodiment in which the event is recorded by the device 100 (e.g., apparatus 50) together with the collection of the emotional response of a user (e.g., through emotion interface 80), the event and the emotional response timeline corresponding to the event may both be stored in the memory device 76. Optionally, the event and the emotional response timeline may be stored as a single file for future use as detailed further below.

According to example embodiments of the present invention, events such as media files or other content can be enhanced and effectively summarized by implementing a timeline of an emotional response to the event or an "emotional timeline." Emotional response can be represented by a value where the greater the emotional response, the greater the value. For example, an increased heart rate relative to a calibrated baseline heart rate may represent a higher value of emotional response. Similarly, an increase in facial flush, vocalizations, or facial expressions can be used to increase the emotional response value.

Figure 4:
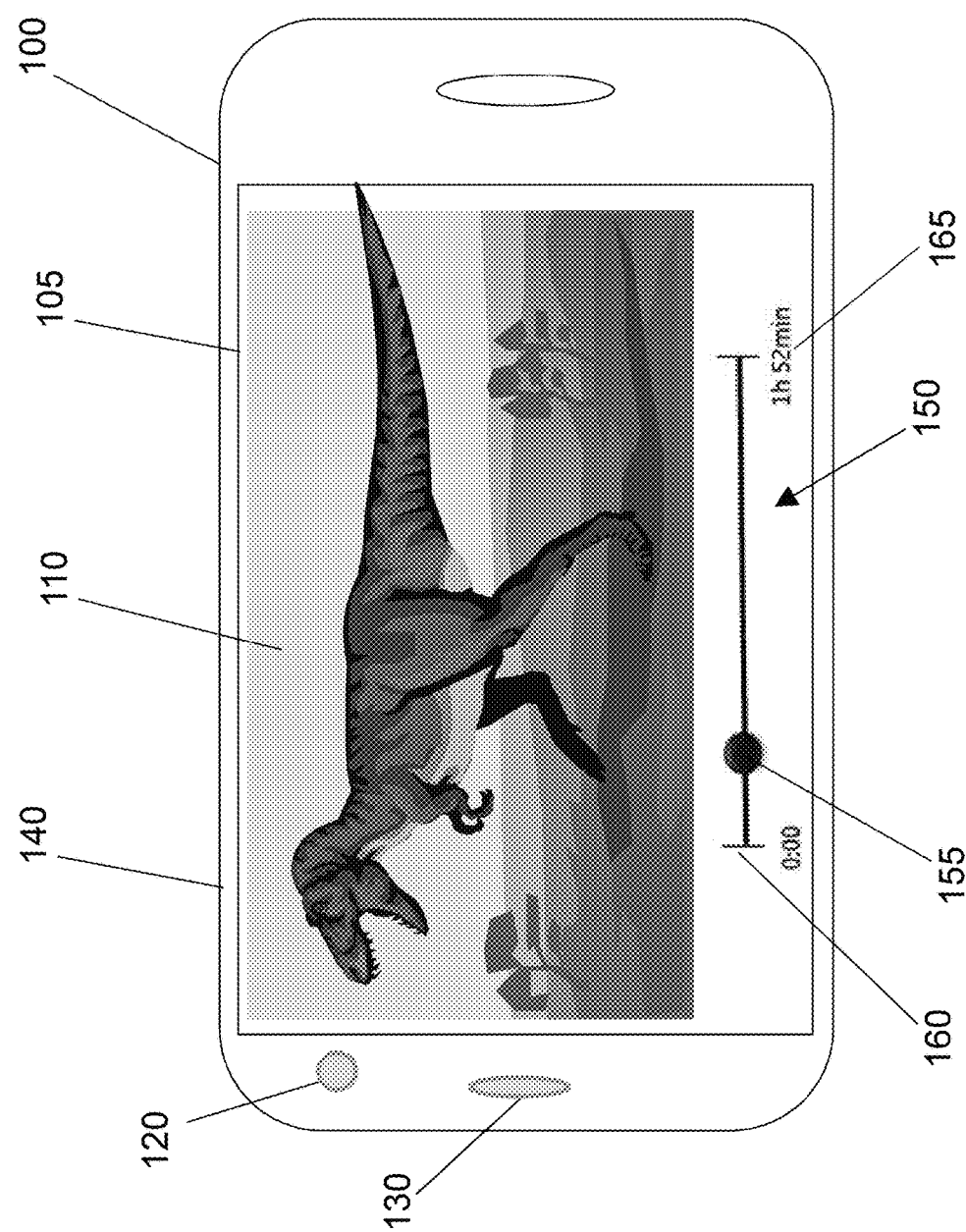
FIG. 4 illustrates a device displaying a video media file on the display according to an example embodiment of the present invention.

FIG. 4 illustrates an example embodiment of a device 100 displaying a video media file 110 on the display 105. The video may include a timeline 150 which displays the position 155 of the currently displayed image between the beginning 160 of the media file 110 (e.g., time 0 hours and 00 minutes) and the end 165 of the media file (e.g., time 1 hour and 52 minutes). The timeline 150 of FIG. 4 is a conventional timeline displaying only the progress of the media file. While the conventional timeline displays progress relative to the beginning and end of an event, it may be desirable to have additional information conveyed through the timeline to enhance a user's experience.

Figure 5:
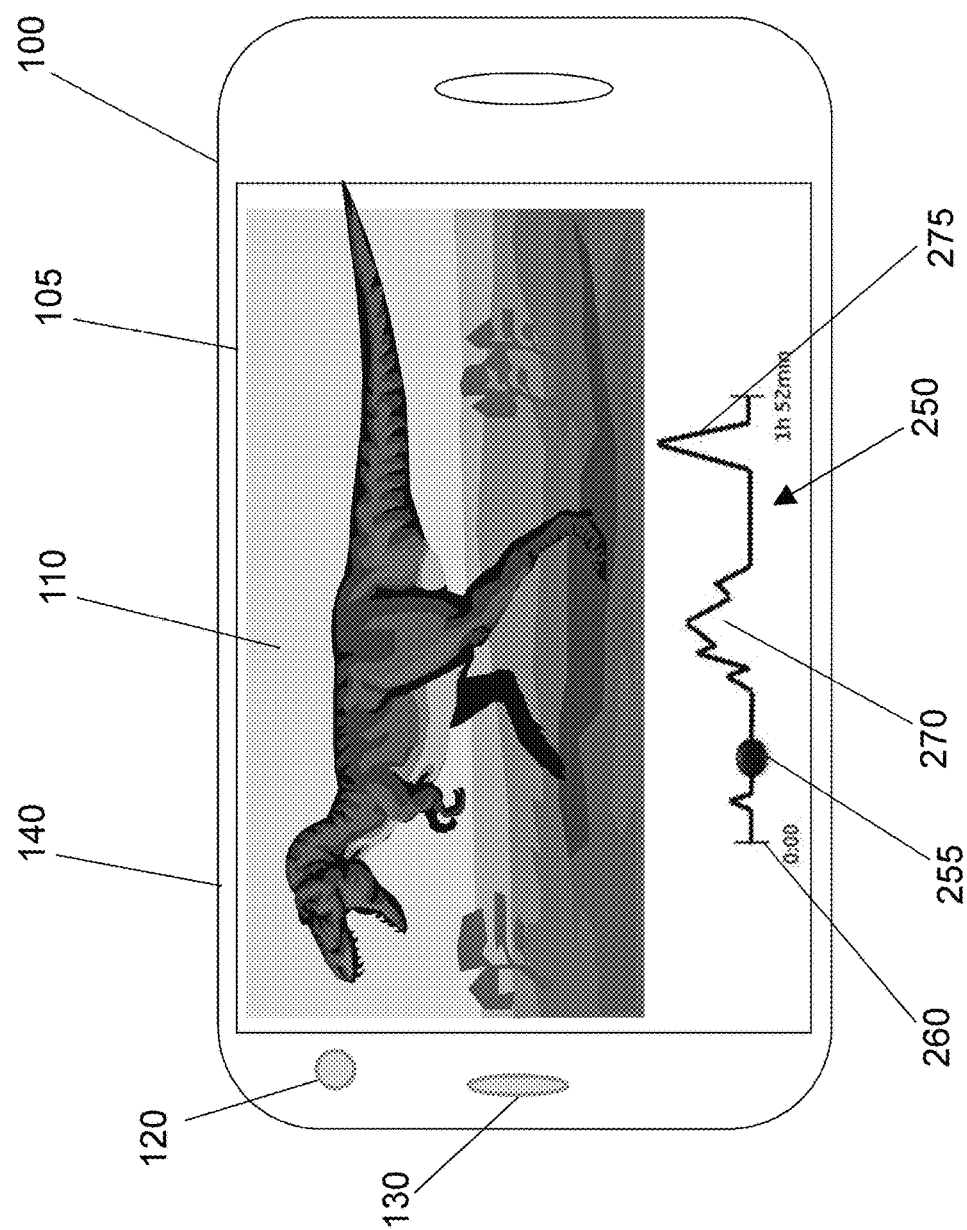
FIG. 5 illustrates an example embodiment of a device displaying a video of a media file on the display including an emotional response timeline according to an example embodiment of the present invention.

FIG. 5 illustrates an example embodiment of a device 100 displaying a video of a media file 110 on the display 105. The timeline 250 of the illustrated embodiment represents a timeline of the event that includes an emotional response such that it is an emotional timeline of the event. The emotional response of a user or of a plurality of users may be used to generate the timeline of emotional response. As illustrated, portions 270 and 275 having larger values as represented by a greater vertical displacement from the baseline elicit significant emotional responses from the user or users that an emotional response was collected from. These portions of the event, such as a video file in the illustrated embodiment, may represent portions of the video file that provoked a strong emotional reaction from a user. A scene may include violence, sadness, happiness, surprise, or other emotions which may be factored in to the strength of the emotional response.

Figure 6:
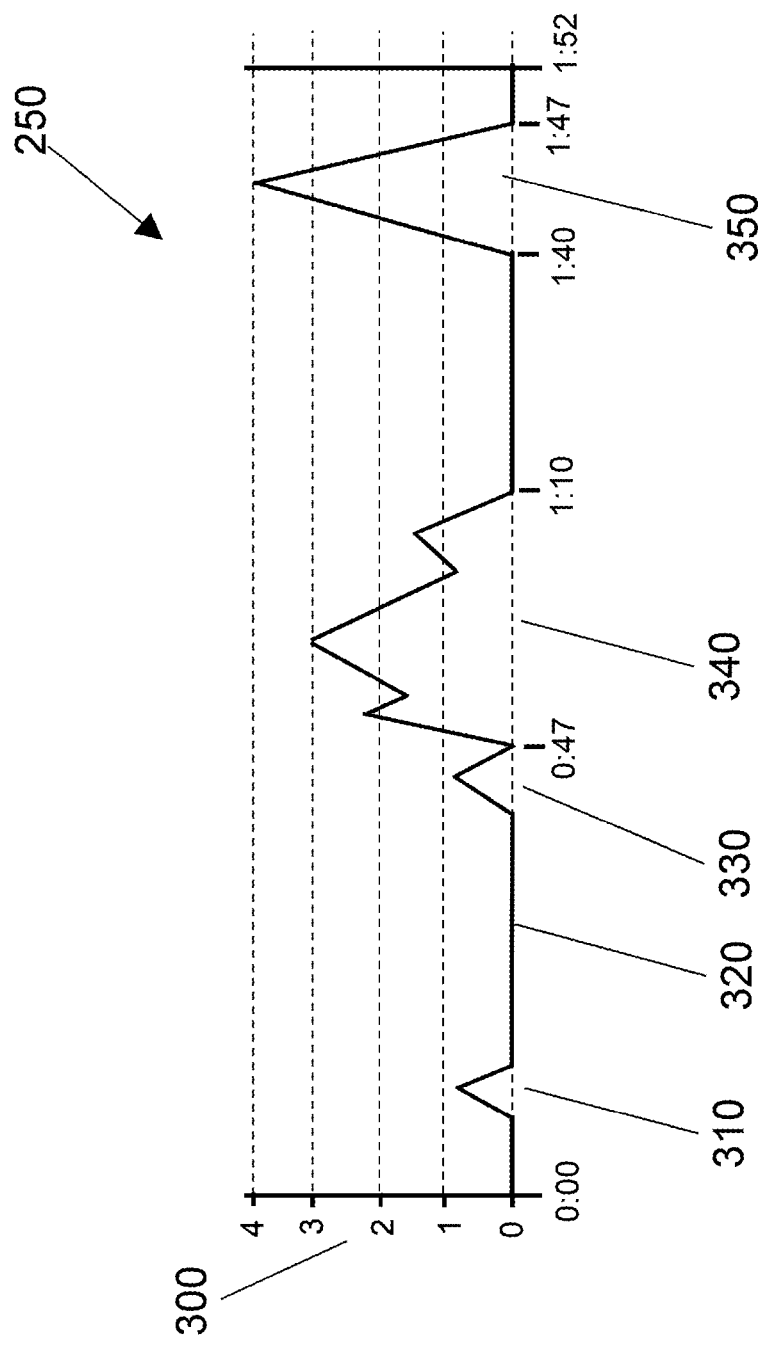
FIG. 6 illustrates the timeline of FIG. 5 shown on a plot to illustrate the emotional response collected according to an example embodiment of the present invention.

FIG. 6 illustrates the emotional response timeline 250 of FIG. 5 shown on a plot to illustrate the emotional response collected, such as through sensors 82 of the emotion interface 80 of FIG. 2. An event such as a movie may include an emotional response timeline which may factor in one or more user's emotions collected while the user was watching the movie. In a crowdsourced example in which users are queried for their input, a movie, such as a new release at a theater, may have an emotional response timeline. The emotional response timeline may be generated by a device or devices configured to determine the emotional response of an audience. The emotional responses gathered may facilitate the generation of an emotional timeline and the emotional timeline may be an average of emotional response timelines from each of a plurality of users. In such an embodiment, the device 100 may collect the emotions of one or more users during the event and generate the emotional response timeline (e.g., at processor 70) to be sent to a database (e.g., via communication interface 74) for aggregation into a crowdsourced emotional response timeline for the movie. Optionally, the device 100 may simply collect emotions and send the emotions via communications interface 74 to an external server for generation of the emotional response timeline.

In the illustrated embodiment of FIG. 6, a movie may be one hour and fifty-two minutes long as shown by the numbers 0:00 and 1:52 at the bottom of the timeline. The emotional response timeline generated from the collected emotional response of one or more people to the movie is depicted as the timeline 250. A scale of emotional response is shown at 300 which depicts the numbers zero through four, with four being the highest emotional response. A baseline of zero emotional response may be calibrated based on known biometric parameters of a user (e.g., resting heart rate, a known unemotional expression, a baseline facial flush level, etc.). In some example embodiments, the zero emotional response baseline may be established at the beginning of an event while in other embodiments a baseline may be calculated after the event. Alternatively or in addition to, in some example embodiments the zero emotional response baseline may be established during the event as the average or median level of different emotional measurements, such as the expression, heart rate, or facial flush level. Any emotional response below a predefined baseline threshold may be considered a zero emotional response. For example, if a person's resting heart rate is sixty beats-per-minute (BPM), a heart rate of sixty-three beats-per-minute may not be considered elevated sufficiently to be above a zero or baseline emotional response level. In some example embodiments, the thresholds for the emotional responses are learned by the device during an enrollment stage, during which the device may present a sequence of known content, such as images or video clips, to the user, and then measure the responses. For example, the enrollment content may represent violent, sad, disgusting, happy, romantic, scary, etc. content and the purpose is to measure the user's reactions to these. Furthermore, different degrees of for example scary content (e.g., slightly scary, moderately scary, highly frightening) may be presented to the user to get the scale of her reactions stored and learned in the system as described further below.

While each type of emotional response (heart rate, facial flush, vocalization, expression, etc.) may have a range within which the emotional response is considered a baseline, embodiments of the present invention may take into account some or all of the emotional responses available to determine whether an elevated emotional response is experienced. For example, a mildly elevated heart rate together with a mildly elevated facial flush and a gasping vocalization may be considered an elevated emotional response (e.g., non-baseline or non-zero) whereas any one of those emotional responses taken individually may be considered baseline or zero emotional response.

Referring back to FIG. 6, a first elevated emotional response is shown at 310 which registers an emotional response below the level-1 line. While the levels zero through four are shown, these numbers are merely for reference and any scale may be employed. At 330, a second elevated emotional response is encountered; however, the emotional response remains below the level-1. At 340, an elevated emotional response is seen and a time demarcation of 0:47 (zero hours, forty-seven minutes) is shown at the beginning of the elevated emotional response 340. The emotional response 340 rises above the level-2 before falling below the level-2, and then rising again to a level-3 emotional response. Another elevated response is seen before the emotional response returns to a baseline emotional response at timestamp 1:10. In the illustrated embodiment, the elevated emotional response duration is from 0:47 to 1:10, or twenty-three minutes. Another elevated emotional response is illustrated at 350 which begins at 1:40 and ends at 1:47. The elevated emotional response of 350 peaks at level-4, or the maximum level of the illustrated timeline chart such that the emotional response is interpreted to be very strong.

The emotional response timeline of FIG. 6 may illustrate the emotional response of a single user to an event, or a plurality of users to the same event as detected by the emotion interface 80. In an embodiment where the emotional response timeline is from a single person, certain time periods of the event may cause a particularly striking emotional reaction for a single user, but when multiple users are averaged together, the emotional response may be lowered. As such, an average, aggregate emotional response timeline may be beneficial for certain users or certain applications. Meanwhile, an emotional response timeline for a single user may be useful for that particular user who does not find the same things as emotionally stimulating as seen in an "average" emotional response timeline. As such, an emotional response timeline may be useful for a variety of functions. Emotions, as detected by the emotion interface, may include any of the emotions described above such as a heart rate, a vocalization, a facial flushing, or a facial expression as described above. The level of emotional response (e.g., the vertical displacement on timeline 250) may be related to the degree of emotion expressed by a user. For example, a loud vocalization may signify a higher emotional response level than a soft vocalization. A high heart rate may signify a higher emotional response level than a slower heart rate. A more rosy hue of facial flushing may signify a higher emotional response level than a less rosy hue. A big smile may signify a higher emotional response level than a smaller smile, etc.

The emotion interface may be calibrated to suit a particular user, or may use population averages to estimate an emotional response level of a person for whom the emotion interface 80 may not be specifically calibrated. Calibration of the emotion interface may be performed, for example, by the presentation of a series of images, video media files, and/or audio media files. Each of the series of images or media files may be selected by virtue of their universal, or substantially universal appeal to specific emotions. For example, an image of a puppy may be shown to a user to calibrate the user's happy or adoring emotional response.

Similarly, images or media files related to classic horror movies may be used to calibrate the emotion interface 80 to recognize a fearful response. In the case of emotion interfaces 80 not calibrated to specific users, smiles may be an easily and universally recognized emotional response, but more subtle emotional responses may not be recognized between individuals for whom the emotion interface 80 is not calibrated.

Figure 7:
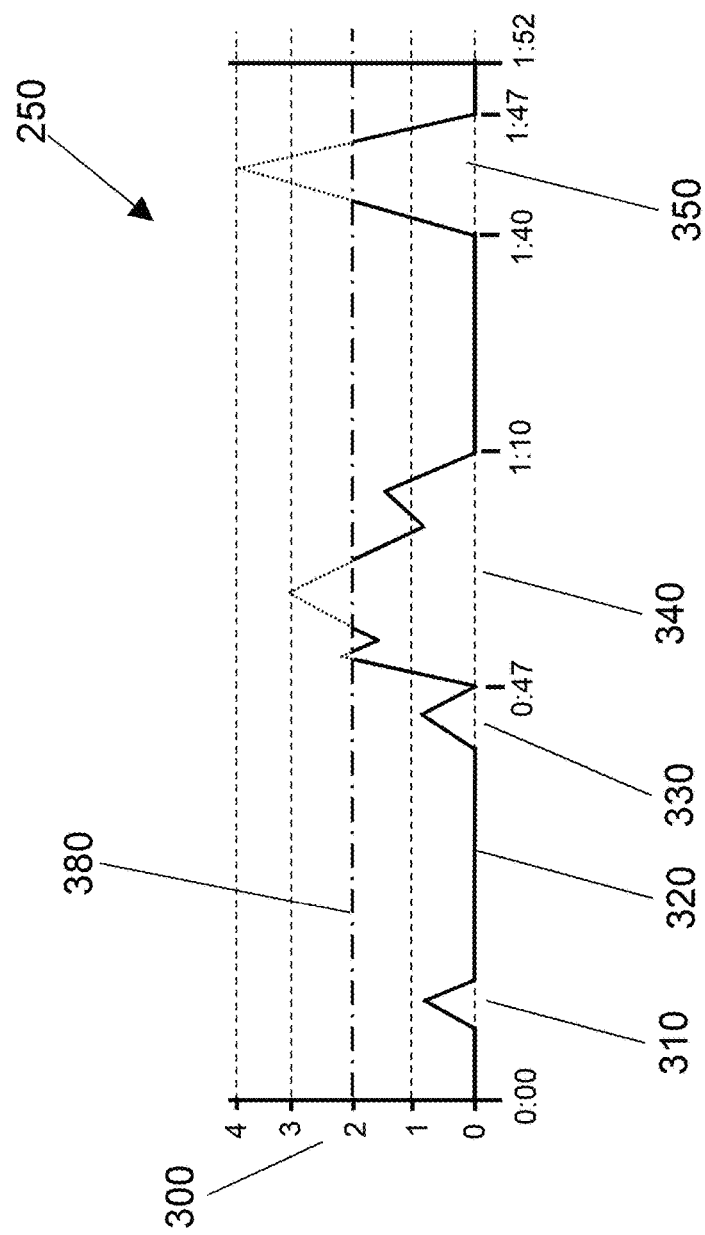
FIG. 7 illustrates one example of how an emotional response timeline may be used according to an embodiment of the present invention.

FIG. 7 illustrates one example embodiment of how an emotional response timeline may be used. The illustrated embodiment depicts the emotional response timeline of FIG. 6; however, a threshold 380 has been added. The illustrated threshold 380 is shown at emotional response level-2; however, the threshold may be user adjustable (e.g., via user interface 72 of FIG. 2) and may be set as desired. The threshold 380 may be used to exclude highly-emotional portions of the event from being played during playback. For example, in an embodiment of a movie as the event, emotional scenes that prompt an emotional response above level-2 may include excessive violence or other emotionally charged scenes that a user does not wish to view or does not wish for others, such as children to view. In such an embodiment, an edited event may be created where scenes of the event above the threshold 380 emotional response level may be omitted from playback of the event, or may be otherwise obscured through visual and/or audible obfuscation. The omitted/obscured scenes of the event are shown in a dashed line format above the threshold 380 and, in one embodiment, an authorized user such as a parent, may change the threshold, such as via input provided via the user interface. Optionally, a series of still images from the omitted scenes may be shown in the edited event in place of a video of the omitted scene to mitigate the emotional response, while allowing a viewer to maintain an understanding of the plot. Visual content recognition may be used to determine suitable still images, such as those omitting violence or nudity.

Figure 8:
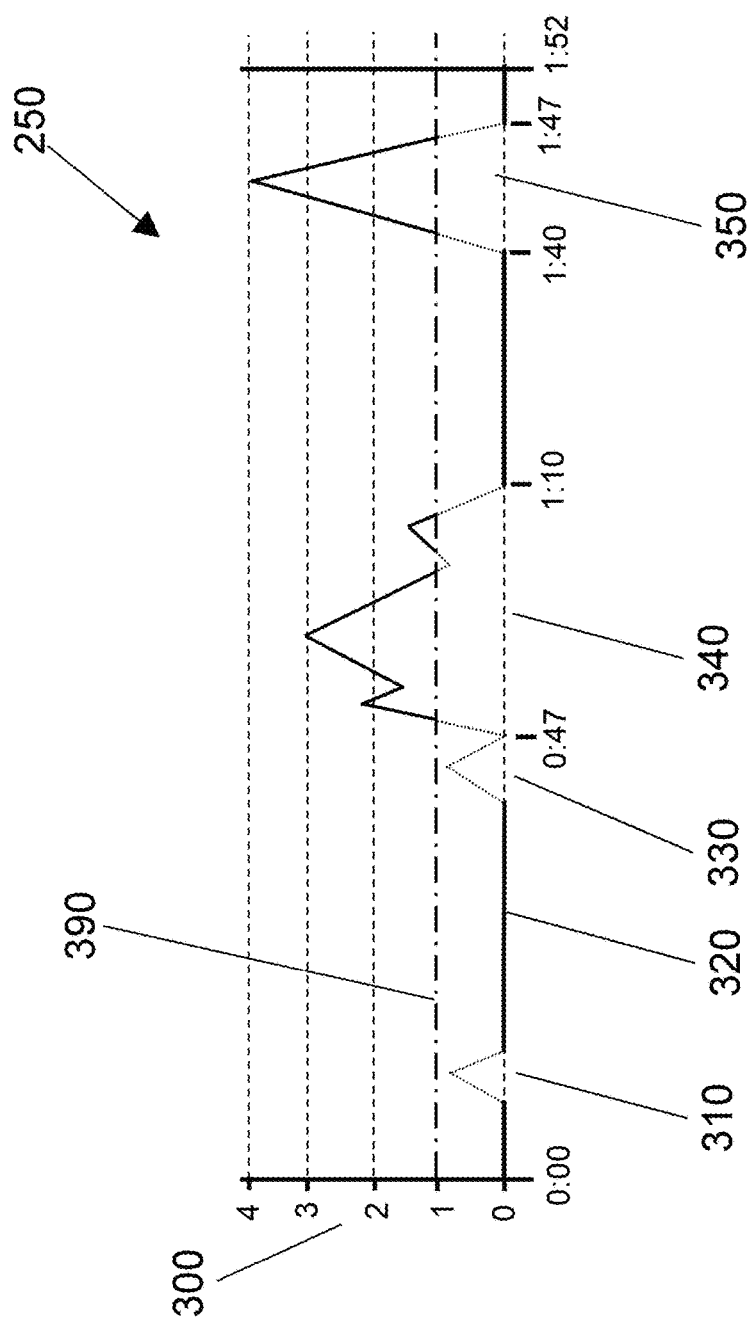
FIG. 8 illustrates another example of how an emotional response timeline may be used according to another embodiment of the present invention.

FIG. 8 illustrates another example embodiment of how an emotional response timeline may be used. The illustrated embodiment depicts the emotional response timeline of FIG. 6; however, threshold 390 has been added. The illustrated threshold 390 is shown at emotional response level-1. A user may not wish to watch an entire event, such as a news cast, a concert, a political speech, or other event; however, they may wish to watch the highlights of the event, which may correspond to those portions that elicited a heightened emotional response. As such, the user may use a threshold or predefined emotional response level below which portions of the event are to be omitted. In such an embodiment, only those portions of the event at 340 and 350 may be shown to a user, thereby creating an edited event comprising a summary of the most emotionally significant portions of the event. Such an embodiment may be particularly useful, for example, in creating an edited event which is a summary of a sporting event. The periods of greatest emotional response will generally be the highlights, including positives and negatives, of the sporting event. The higher the threshold 390 is set, the shorter the edited event will become. Similarly, an edited event may be a trailer for a movie which may be generated by showing some or all of the portions of the movie with a high emotional response. This created edited event may be beneficial when transferring or storing the event as a file as the edited event may consume less memory and require less bandwidth for transfer. While the edited event may only include those portions above a predefined threshold, the edited event of one embodiment may include predefined portions that precede and/or follow those portions above a predefined threshold so as to provide sufficient context.

Figure 9:
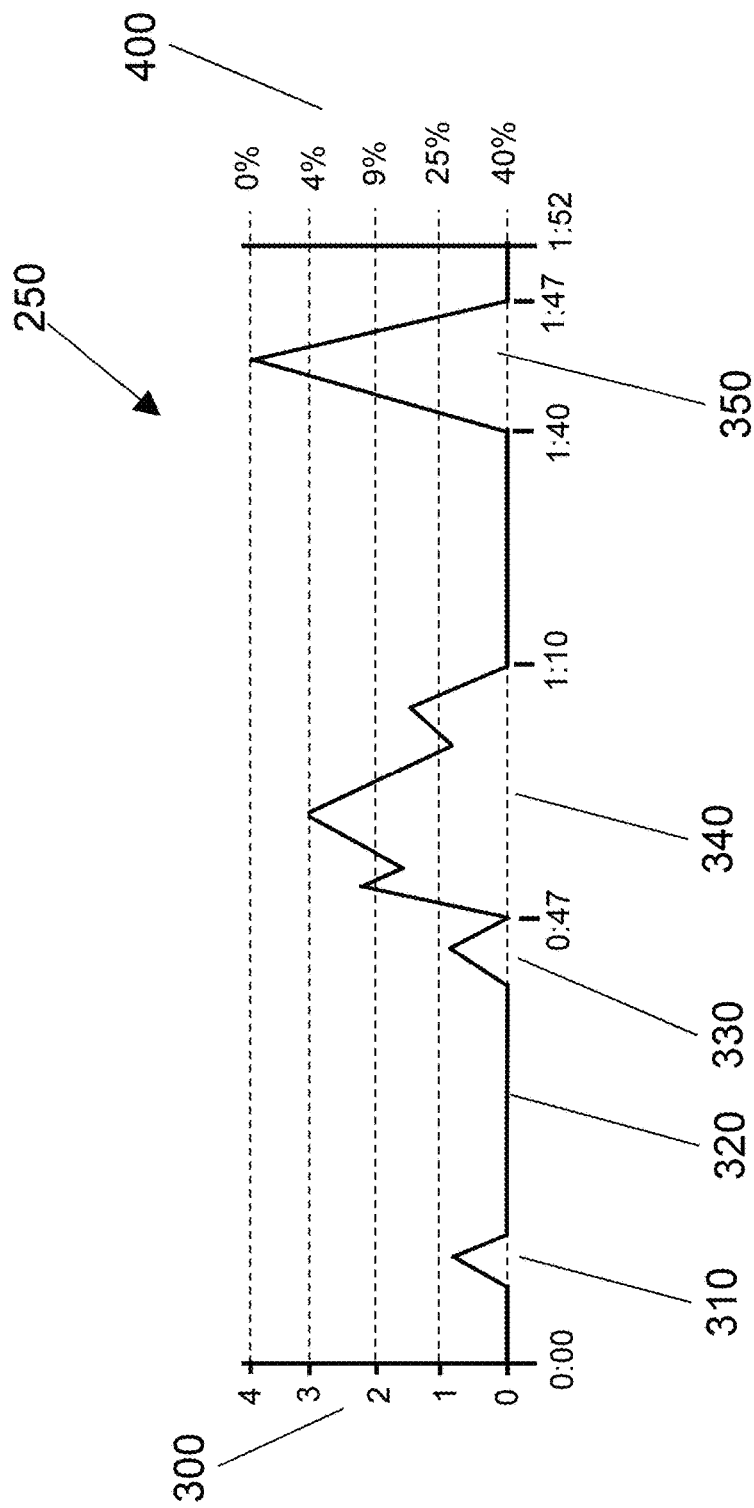
FIG. 9 illustrates another example of how an emotional response timeline may be used according to an embodiment of the present invention.

FIG. 9 illustrates another example embodiment of how an emotional response timeline may be used. The illustrated embodiment depicts the emotional response timeline of FIG. 6; however, a rating level 400 has been introduced. In the illustrated embodiment, the rating level 400 shows the percentage of the event above a threshold value. For example, 40% of the event prompts an emotional response above the baseline zero-level, 25% of the event elicits an emotional response above level-1, 9% of the event elicits an emotional response above level-2, and 4% of the event prompts an emotional response above level-3. In this manner, a user may be able to determine if a particular event is appropriate for them or for a child, or if that event fulfills the emotional response desired by a user before they watch or listen to the event. Embodiments of the present invention may similarly be implemented for events that are music, such as a song. Songs may be filtered for the more emotionally provocative portions and a user may choose to listen only to music that elicits an emotional response of at least level-2 for at least 50% of the song.

Figure 10:
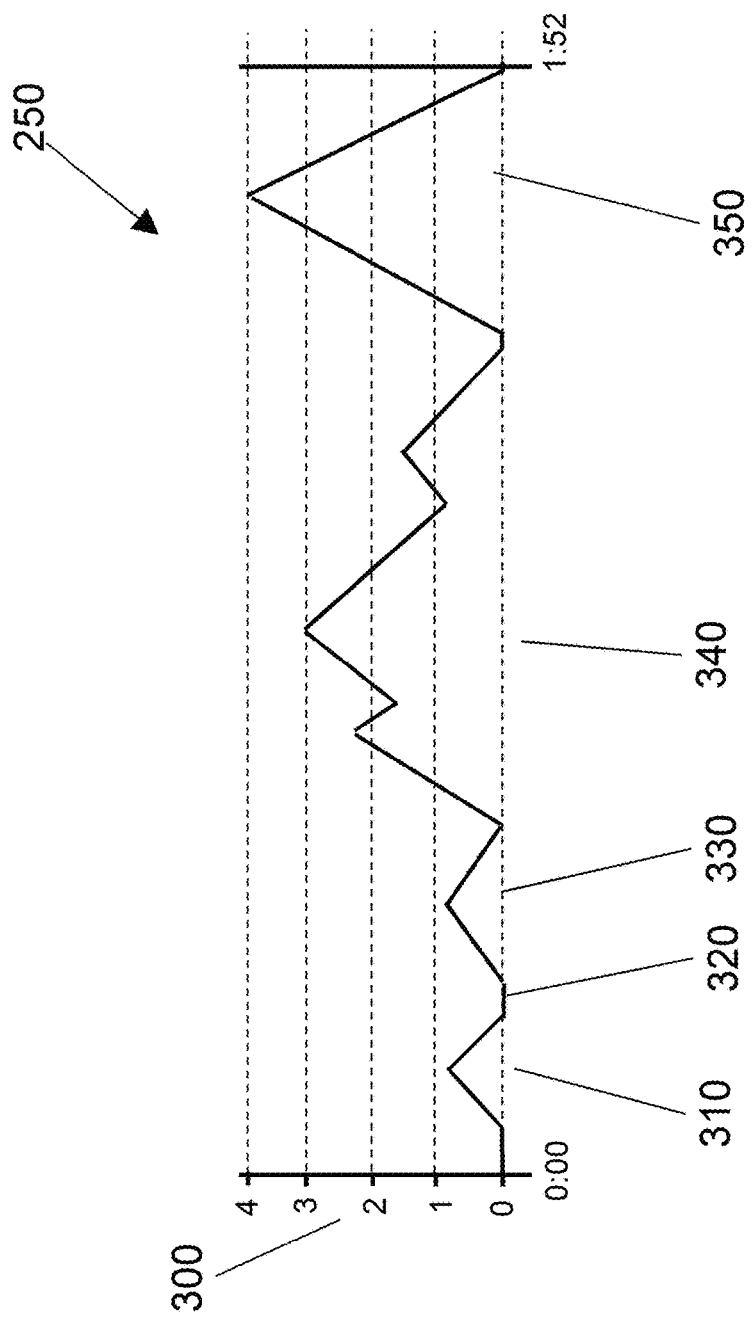
FIG. 10 illustrates still another example of how an emotional response timeline may be used according to another embodiment of the present invention.

FIG. 10 illustrates still another example embodiment of how an emotional response timeline may be used. The illustrated embodiment depicts the emotional response timeline of FIG. 6; however, the portions of the event with a baseline level of emotional response 320 have been shortened in length in the edited event while the portions with a higher level of emotional response (e.g., 310, 330, 340, 350) have each been lengthened in the edited event, relative to the original event. Such elongation of the more emotional portions while shortening the less emotional portions may be beneficial for creating events that stimulate a user's emotional response. An edited event of a sporting event, a movie (e.g., a nature movie), or other event may include portions which are elongated in time to create an event that has slow-motion, high-emotion portions. The portions may be shortened and/or elongated in various manners, such as by increasing or reducing, respectively, the frame rate of a video or by increasing or reducing, respectively, the playback speed of a music file. Alternatively or in addition to, the increasing or reducing the portions may be implemented by repeating or removing some segments of the video and/or sound. Known methods for audio time scale modification may be used to adjust the music or video sound track duration. Optionally, the portions 320 that do not elicit an emotional response from a user may be omitted and the overall length of time of the event may be consummately reduced, e.g., from one hour and fifty-two minutes to thirty minutes.

Figure 11:
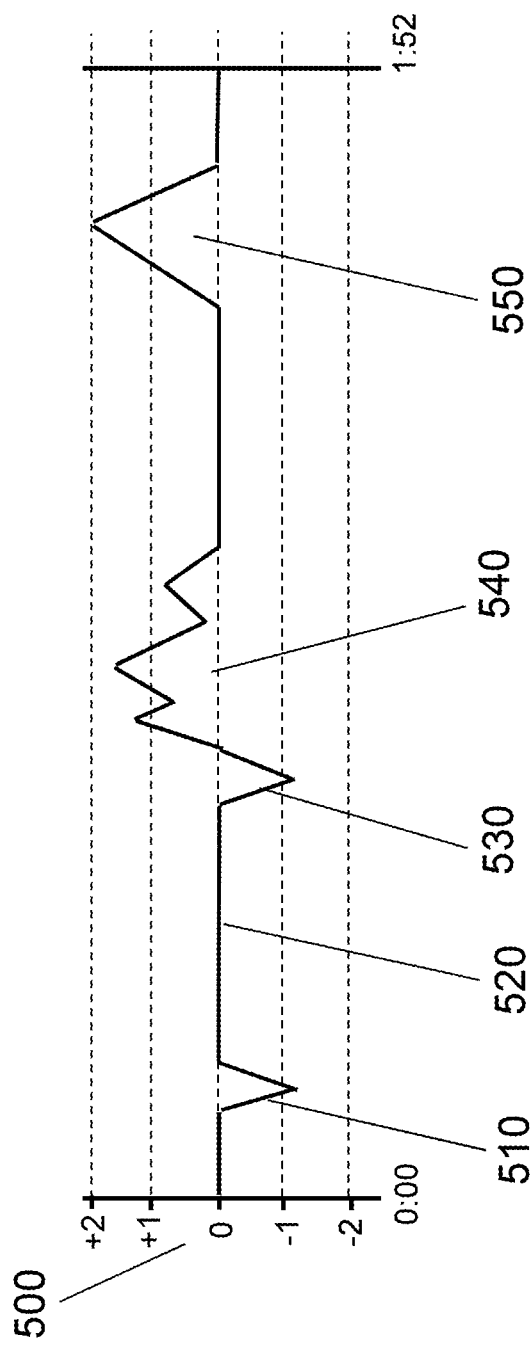
FIG. 11 illustrates an example of an emotional response timeline which depicts positive emotion versus negative emotion according to yet another embodiment of the present invention.

While the aforementioned embodiments have been described with respect to an emotional response, example embodiments of the present invention may also differentiate between types of emotions, such as based upon different predefined types of emotional responses. For example, a positive emotion may be distinguished from a negative emotion. A positive emotion may include smiling, clapping, cheering, etc. A negative emotion may include frowning, crying, etc. FIG. 11 illustrates an example embodiment of an emotional response timeline which depicts positive emotion versus negative emotion. The positive emotion may be displayed above a baseline zero-level emotion (e.g., +1 and +2 of scale 500) while the negative emotion may be shown below the baseline zero-level emotion (e.g., −1 and −2 of scale 500). An emotional timeline as illustrated in FIG. 11 may be used to help a user determine whether the event is one they wish to view or hear, or whether the event will be an uplifting event or a depressing event. The thresholds described above may similarly be applied to one or both of the positive or negative emotional response levels to tailor the event to a particular user.

Emotions may not be explicitly positive or negative such that further differentiation may be available according to example embodiments of the present invention. For example, color-coding of the emotional response timeline may be configured to determine an emotion (e.g., through emotion detection unit 84) to ascertain whether it is happy, sad, surprised, scared, etc. In this manner, a timeline may be color coded to distinguish the types of emotional reaction experienced during the event. As another example, different graphical elements depicting the different emotional states may be used for visualizing the states on the timeline.

FIG. 12 illustrates another example embodiment of an emotional response timeline 660 for an event where the event is an orchestral concert. The emotional response timeline is shown with the scale depicting the number of orchestral instruments. The orchestral concert starts with a single instrument at 610, which quickly builds to forty instruments at 620. The number of instruments falls at 630 before building again at 640 to twenty instruments, and falling again to five instruments at 650 for the conclusion. In this manner, a user may apply a threshold to the number of instruments of 10 (shown in scale 600) whereby an edited event which is a summary of the orchestral concert may include only those portions with ten or more instruments playing.

FIG. 13 is a flowchart of a method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user device and executed by a processor in the user device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 13, may include generating a timeline of a collected emotional response of a user relative to an event at 710, selecting a portion of the timeline of the emotional response that meets a predetermined criterion at 720, and generating an edited event based on the portion of the timeline of the emotional response that meets the at least one predetermined criterion at 740.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein. With reference to the method of FIG. 13, in some example embodiments, the method may include calibrating a baseline emotional response for the event as shown at 740.

In an example embodiment, an apparatus for performing the method of FIG. 13 above may comprise a processor (e.g., the processor 70) configured to perform some or each of the operations (710-740) described above. The processor 70 may, for example, be configured to perform the operations (710-740) by performing hardware implemented logical functions, executing stored instructions, or executing algorithms for performing each of the operations. Alternatively, the apparatus may comprise means, such as the processor 70, the processor 70 and memory 76 storing computer program code, a computer program product or the like, for performing each of the operations described above.

An example of an apparatus according to an example embodiment may include at least one processor and at least one memory including computer program code. The at least one memory and the computer program code may be configured to, with the at least one processor, cause the apparatus to perform the operations 710-740 (with or without the modifications and amplifications described above in any combination).

An example of a computer program product according to an example embodiment may include at least one computer-readable storage medium having computer-executable program code portions stored therein. The computer-executable program code portions may include program code instructions for performing operations 710-740 (with or without the modifications and amplifications described above in any combination).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
generating a timeline of a collected emotional response of a user relative to an original media file, wherein the emotional response includes one or more of a heart rate, a facial expression, a vocalization, or a facial flush;
selecting, by a processor, a portion of the timeline of the emotional response that meets at least one predetermined criterion; and
generating an edited media file based on the portion of the timeline of the emotional response that meets the at least one predetermined criterion, wherein the edited media file comprises a media file including only portions of the original media file, wherein at least a portion of the edited media file comprises a portion of increased frame rate or reduced frame rate relative to an original frame rate of the original media file, and wherein the portions of the original media file include only those portions of the original media file where the emotional response was above a threshold and a predefined length of time immediately preceding those portions of the original media file where the emotional response was above a threshold.

2. The method of claim 1, wherein the at least one predetermined criterion includes at least one of a heart rate above a predefined threshold, a facial expression of at least one predefined type, a vocalization of at least one predetermined utterance, or a facial flush of a predefined hue.

3. The method of claim 2, wherein each of the at least one predetermined criterion is user adjustable.

4. The method of claim 1, further comprising calibrating a baseline emotional response for the event.

5. The method of claim 1, wherein the portions of the original medial file where the emotional response was above a threshold are included in the edited media file at a reduced frame rate relative to the original media file.

6. An apparatus comprising at least one processor and at least one memory including computer program code, the at least one memory and the computer program code configured to, with the at least one processor, cause the apparatus to:
generate a timeline of a collected emotional response of a user relative to an original media file, wherein the emotional response includes one or more of a heart rate, a facial expression, a vocalization, or a facial flush;
select a portion of the timeline of the emotional response that meets at least one predetermined criterion; and
generate an edited media file based on the portion of the timeline of the emotional response that meets the at least one predetermined criterion, wherein the edited media file comprises a media file including only portions of the original media file, wherein at least a portion of the edited media file comprises a portion of increased frame rate or reduced frame rate relative to an original frame rate of the original media file, and only those portions of the original media file where the emotional response was above a threshold and a predefined length of time immediately preceding those portions of the original media file where the emotional response was above a threshold.

7. The apparatus of claim 6, wherein the at least one predetermined criterion includes an emotional response above a predefined threshold.

8. The apparatus of claim 6, wherein the at least one predetermined criterion includes at least one of a heart rate above a predefined threshold, a facial expression of at least one predefined type, a vocalization of at least one predetermined utterance, or a facial flush of a predefined hue.

9. The apparatus of claim 8, wherein each of the at least one predetermined criterion is user adjustable.

10. The apparatus of claim 6, wherein the apparatus further caused to calibrate a baseline emotional response for the event.

11. The apparatus of claim 6, wherein the emotional response includes a vocalization of at least one predetermined utterance.

12. A computer program product comprising at least one non-transitory computer-readable storage medium having computer executable program code instructions stored therein, the computer executable program code instructions comprising:
program code instructions to generate a timeline of a collected emotional response of a user relative to an original media file, wherein the emotional response includes one or more of a heart rate, a facial expression, a vocalization, or a facial flush;
program code instructions to select a portion of the timeline of the emotional response that meets at least one predetermined criterion; and
program code instructions to generate an edited media file based on the portion of the timeline of the emotional response that meets the at least one predetermined criterion, wherein the edited media file comprises a media file including only portions of the original media file, wherein at least a portion of the edited media file comprises a portion of increased frame rate or reduced frame rate relative to an original frame rate of the original media file, and only those portions of the original media file where the emotional response was above a threshold and a predefined length of time immediately preceding those portions of the original media file where the emotional response was above a threshold.

13. The computer program product of claim 12, wherein the at least one predetermined criterion includes an emotional response above a predefined threshold.

14. The computer program product of claim 12, wherein the at least one predetermined criterion includes at least one of a heart rate above a predefined threshold, a facial expression of at least one predefined type, a vocalization of at least one predetermined utterance, or a facial flush of a predefined hue.

15. The computer program product of claim 14, wherein each of the at least one predetermined criterion is user adjustable.

* * * * *